(12) United States Patent
Yoshida et al.

(10) Patent No.: US 11,682,430 B2
(45) Date of Patent: Jun. 20, 2023

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Osamu Yoshida, Kanagawa (JP); Tatsuo Nitta, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/473,596

(22) Filed: Sep. 13, 2021

(65) Prior Publication Data
US 2022/0310123 A1    Sep. 29, 2022

(30) Foreign Application Priority Data
Mar. 23, 2021  (JP) .............................. JP2021-048567

(51) Int. Cl.
*G11B 5/58*    (2006.01)
*G11B 21/08*   (2006.01)
*G11B 5/012*   (2006.01)

(52) U.S. Cl.
CPC .............. *G11B 21/08* (2013.01); *G11B 5/012* (2013.01)

(58) Field of Classification Search
CPC ... G11B 5/54; G11B 5/55633; G11B 5/59633; G11B 5/56; G11B 5/58; G11B 15/005; G11B 20/12; G11B 20/18; G11B 5/012; G11B 21/08
USPC ......................................... 360/75, 48, 63, 31
See application file for complete search history.

(56) References Cited

U.S. PATENT DOCUMENTS

| 5,572,379 A | 11/1996 | Aoi et al. |
| 7,359,134 B2 * | 4/2008 | Komatsu ................ G11B 33/12 |
| 10,283,149 B2 | 5/2019 | Lamberts et al. |

* cited by examiner

*Primary Examiner* — Nabil Z Hindi
(74) *Attorney, Agent, or Firm* — Allen & Overy LLP (57) ABSTRACT

According to one embodiment, a magnetic disk device includes a plurality of magnetic disks, a plurality of magnetic heads provided correspondingly to the plurality of magnetic disks and configured to carry out read/write of data from/to the magnetic disks, and a control section configured to control read/write of the magnetic heads. Each of the plurality of magnetic disks includes a first storage section storing therein control information concerning read/write of the magnetic head. The control section switches the first storage section which is a storage destination of first information that is at least a part of the control information from the magnetic disk to another magnetic disk.

8 Claims, 5 Drawing Sheets

| | 0 | 1 | 2 | 3 | 4 | 5 | 6 | 7 |
|---|---|---|---|---|---|---|---|---|
| 0 | Header | | | | | | | |
| 16 | | | | | | | | |
| 32 | SA-H1 | | Status | | Update count | | | |
| ⋮ | SA-H2 | | Status | | Update count | | | |
| | SA-H3 | | Status | | Update count | | | |
| | ⋮ | | ⋮ | | ⋮ | | | |
| | Footer | | | | | | | |

MAGNETIC DISK DEVICE

CROSS-REFERENCE TO RELATED APPLICATIONS

This application is based upon and claims the benefit of priority from Japanese Patent Application No. 2021-048567, filed Mar. 23, 2021, the entire contents of which are incorporated herein by reference.

FIELD

Embodiments described herein relate generally to a magnetic disk device.

BACKGROUND

A technique of switching magnetic heads in sequence at the time of following in a magnetic disk device in such a manner that the accumulated total of data reproduction time at each of a plurality of magnetic heads and positioning data reproduction time concomitant with seek operations and following operations of each of the plurality of magnetic heads is equalized among the magnetic heads is known.

In a magnetic disk device, control information to be stored in a magnetic disk is multiplexed for the purpose or enhancing the reliability. Control information is multiplexed into, for example, twofold or fourfold information and is stored on a plurality of magnetic disks. The multiplexed control information is stored at a fixed position in a system area of the magnetic disk set in advance. Further, storing the multiplexed control information items alternately in different areas is also carried out. In either case, the storage destination of the control information is fixed to a specific magnetic head of the plurality of magnetic heads provided in the magnetic disk device, and the control information is stored on the magnetic disk by the magnetic head concerned. The control information is stored by using the specific magnetic head, and hence the use frequency of the magnetic head concerned becomes higher in comparison with other magnetic heads.

Embodiments described herein aim to provide a magnetic disk device capable of preventing unevenness in storage of control information from occurring.

DETAILED DESCRIPTION

In general, according to one embodiment, a magnetic disk device includes a plurality of magnetic disks, a plurality of magnetic heads provided correspondingly to the plurality of magnetic disks and configured to carry out read/write of data from/to the magnetic disks, and a control section configured to control read/write of the magnetic heads. Each of the plurality of magnetic disks includes a first storage section storing therein control information concerning read/write of the magnetic head. The control section switches the first storage section which is a storage destination of first information that is at least a part of the control information from the magnetic disk to another magnetic disk.

Embodiments will be described hereinafter with reference to the accompanying drawings. Note that the disclosure is merely an example, and the invention is rot limited by the contents of the embodiments provided below. In addition, in some cases, in order to make the description clearer, the widths, thicknesses, shapes, etc., of the respective parts are schematical y illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

Figure 1:
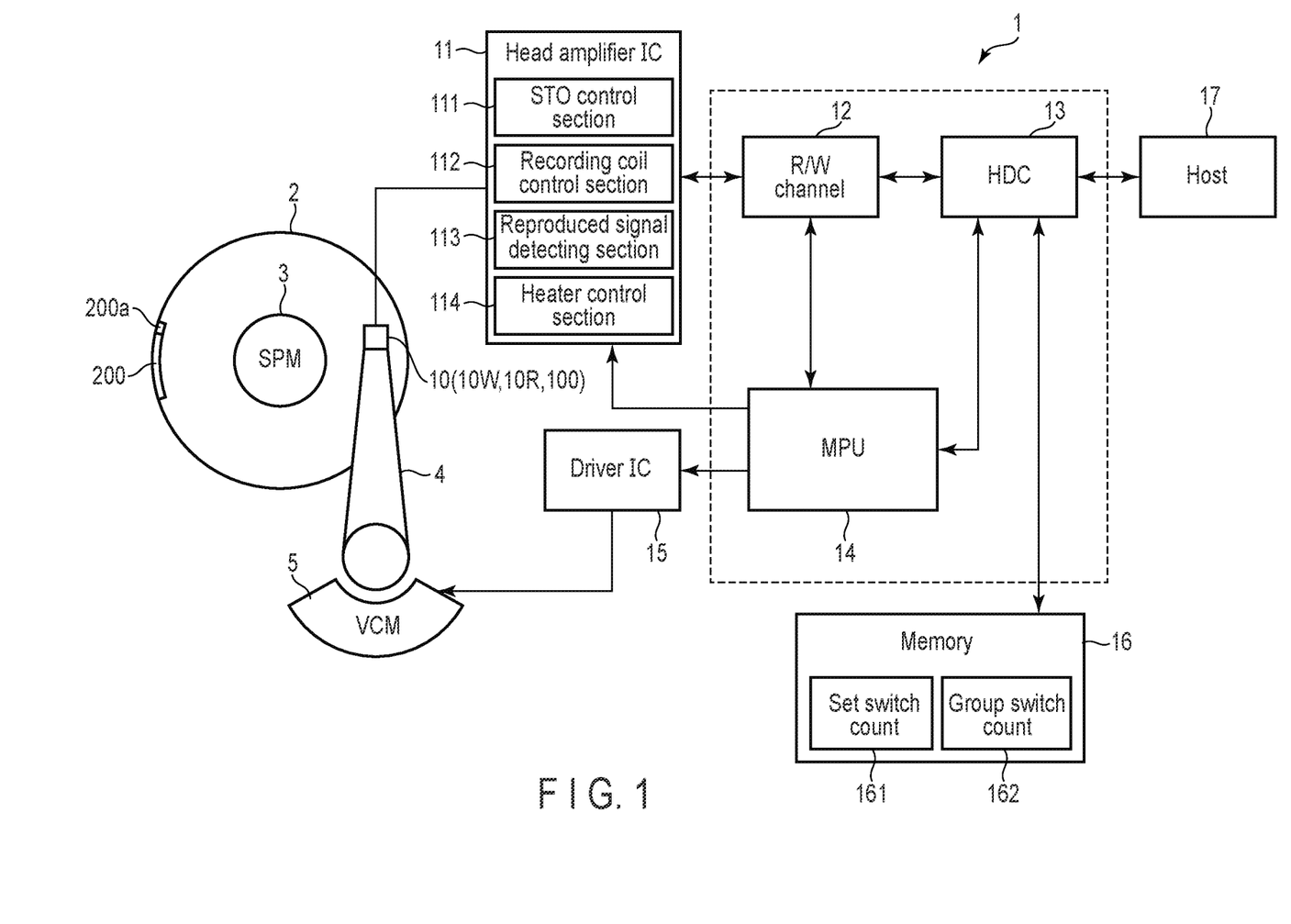
FIG. 1 is a block diagram showing an example of the configuration of a magnetic disk device according to an embodiment.

FIG. 1 is a block diagram showing an example of the configuration of a magnetic disk device according to this embodiment.

As shown in FIG. 1, the magnetic disk device 1 is configured as, for example, a hard disk drive (HDD) and is provided with a magnetic disk 2, spindle motor (SPM) 3, actuator 4, voice coil motor (VCM) 5, magnetic head 10, head amplifier IC 11, R/W channel 12, hard disk controller (MDC) 13, microprocessor unit (MPU) 14, driver IC 15, and memory 16. Further, the magnetic disk device is connectable to a host computer (host) 17. Although details will be described later, the magnetic head 10 is provided with a write head (recording magnetic head: writer) 10W, read head reproducing magnetic head: reader) 10R, and spin-torque-oscillator (STO) 100 which is a high-frequency oscillation element. It should be noted that the R/W channel 12, HDC 13, and MPU 14 may also be incorporated into a one-chip integrated circuit.

The magnetic disk 2 includes a substrate constituted of, for example, a nonmagnetic etic material and formed into a circular disk-like shape. On each of the surfaces of the substrate, a soft magnetic layer formed of a material exhibiting soft magnetic characteristics and functioning as a foundation layer, magnetic recording layer having magnetic anisotropy in the direction perpendicular to the disk surface and formed on the upper layer of the soft magnetic layer, and protective film layer formed on the upper layer of the magnetic recording layer are stacked on top of each other in layers in the order described. Here, the layers closer to the magnetic head 10 in the direction to the magnetic head 10 are defined as upper layers.

The magnetic disk 2 is fixed to the spindle motor (SPM) 3 and is rotated at a predetermined rotational speed by the SPM 3. It should be noted that the number of the magnetic disk 2 is not limited to one, and a plurality of magnetic disks 2 may also be attached to the SPM 3. The SPM 3 is driven by a drive current (or drive voltage) to be supplied thereto from the driver IC 15. A data pattern is recorded/reproduced on/from the magnetic disk 2 by the magnetic head 10. The magnetic disk 2 includes a system area (first storage section) 200. The system area 200 sores therein first information (in this embodiment, first information is control information relating to write) which is at least a part of control information of data of the magnetic head 10. Further, the system area 200 includes a system area management section (second storage section) 200a. The system area management section 200a manages the control information. The system area 200 is provided, for example, at a part of the magnetic disk 2 on the outermost circumferential side in the radial direction of the magnetic disk 2.

The actuator 4 is provided in such a manner that the actuator 4 can freely be turned, and the magnetic head 10 is supported on the tip section of the actuator 4. The actuator 4 is turned by the voice coil motor (VCM) 5, whereby the magnetic head 10 is moved to a position on the desired track of the magnetic disk 2 and is positioned there. The VCM 5 is driven by a drive current (or drive voltage) to be supplied thereto from the driver IC 15.

The magnetic head 10 includes a slider, and write head 10W and read head IR which are formed on the slider. A plurality of magnetic heads 10 are provided according to the number of the magnetic disks 2.

The head amplifier IC 11 includes a circuit relating to drive and detection of oscillation characteristics of the STO 100. For example, the head amplifier IC 11 includes an STO control section 111, recording coil control section 112, reproduced signal detecting section 113, and heater control section 114. The head amplifier IC 11 executes drive and drive signal detection and the like of the STO 100. Furthermore, the head amplifier IC 11 supplies a write signal (write current) corresponding to write data to be supplied thereto from the R/W channel 12 to the write head 10W. Further, the head amplifier IC 11 amplifies a read signal output from the read head 10R and transmits the amplified read signal to the R/W channel 12.

The STO control section 111 controls a current made to flow through the STO 100 of the write head 10W. The recording coil control section 112 includes a recording signal pattern control section and recording current control section. The recording coil control section 112 controls a recording current to be supplied to the coil of the write head 10W according to a write signal. The reproduced signal detecting section 113 detects a signal (read data) reproduced by the read head 10R. The heater control section 114 controls power supply to the heater to be described later. That is, the heater control section 114 switches between the on-state and off-state of the heater.

The R/W channel 12 is a signal processing circuit configured to process a signal relating to read/write. The R/W channel 12 includes a read channel configured to execute signal processing of read data and write channel configured to execute signal processing of write data. The R/W channel 12 converts a read signal into digital data and decodes read data from the digital data. The R/W channel 12 encodes write data to be transferred thereto from the HDC 13 and transfers the encoded write data to the head amplifier IC 11.

The HDC 13 controls write of data to the magnetic disk 2 and read of data from the magnetic disk 2 through the magnetic head 10, head amplifier IC 11, R/W channel 12, and MPU 14. The HDC 13 constitutes an interface between the magnetic disk device 1 and host 17, and executes transfer control of read data and write data. That is, the HDC 13 functions as a host interface controller configured to receive a signal transferred thereto from the host 17 and transfer a signal to the host 17. When transferring a signal to the host 17, the HDC 13 executes error correction processing of data of a reproduced signal which is read and decoded by the magnetic head 10 in accordance with the control of the MPU 14. Further, the HDC 13 receives a command (write command, read command, and the like) to be transferred thereto from the host 17, and transmits the received command to the MPU 14.

The MPU 14 is the main controller (control section) of the magnetic disk device 1 and executes control of the read/write operation and servo control necessary for positioning of the magnetic head 10. Furthermore, the MPU 14 executes processing of switching the storage destination of the control information. Details of this processing will be described later.

The driver IC 15 controls drive of the SPM 3 and VCM 5 in accordance with the control of the MPU 14. By driving the VCM 5, the magnetic head 10 is positioned to the target track on the magnetic disk 2.

The memory 16 includes a volatile memory and nonvolatile memory. For example, the memory 16 includes a buffer memory constituted of DRAMs and flash memory. The memory 16 stores therein programs and parameters necessary for the processing of the MPU 14. Further, the memory 16 includes a set switch count 161 and group switch count 162. The set switch count 161 and group switch count 162 are used when the MPU 14 executes processing of switching the storage destination to be described later. Although in this embodiment, the set switch count is made ten thousand times and group switch count is made once, these counts are not limited to the above.

Figure 2:
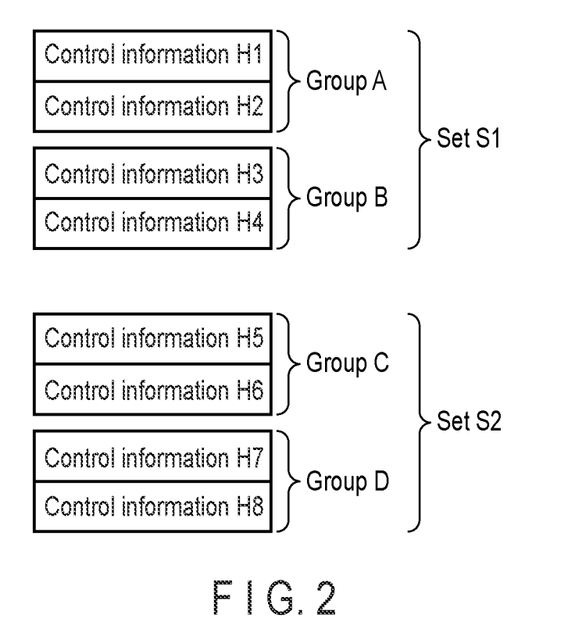
FIG. 2 is a view showing an example of groups and sets.

Next, the group and set configured to manage control information relating to the magnetic head 10 will be described below. FIG. 2 is a view showing an example of groups and sets. In this embodiment, descriptions will be given by taking a case where the magnetic disk device 1 includes eight magnetic heads 10 as an example. It should be noted that the number of the magnetic heads 10 is not limited to this.

As shown in FIG. 2, the magnetic disk device 1 includes control information items from H1 to H8 correspondingly to the eight magnetic heads 10. Each of the control information items from H1 to H8 is stored in the system area 200 of the magnetic disk 2 corresponding to each of the magnetic heads 10.

Four groups from A to D are specified, the group A is constituted of the control information items H1 and H2, group B is constituted of the control information items H3 and H4, group C is constituted of the control information items H5 and H6, and group D is constituted of the control information items H7 and H8. Further, the set S1 is constituted of the control information items H1 to H4 (groups A and B), and set S2 is constituted of the control information items H5 to H8 (groups C and D). As described above, the control information items H1 to H8 corresponding to the eight magnetic heads 10 are constituted of the four groups A to D and two sets S1 and S2. Information specifying such groups A to D and sets S1 and S2 is stored in, for example, the memory 16.

When the MPTU 14 carries out storage of the control information, the storage destination of the control information is one of the four groups A to D and, at that time, the control information is copied within each group. For example, when the group A is the storage destination, after the control information item H1 is stored in the system area 200 of the magnetic disk 2, the control information item H2 having the same contents is stored in the system area 200 of another magnetic disk 2 in the group A. That is the control information item H1 is copied as the control information item H2. As described above, the control information is copied and stored, and hence the control information has redundancy, whereby the reliability of the magnetic disk 1 is secured.

Figure 3:
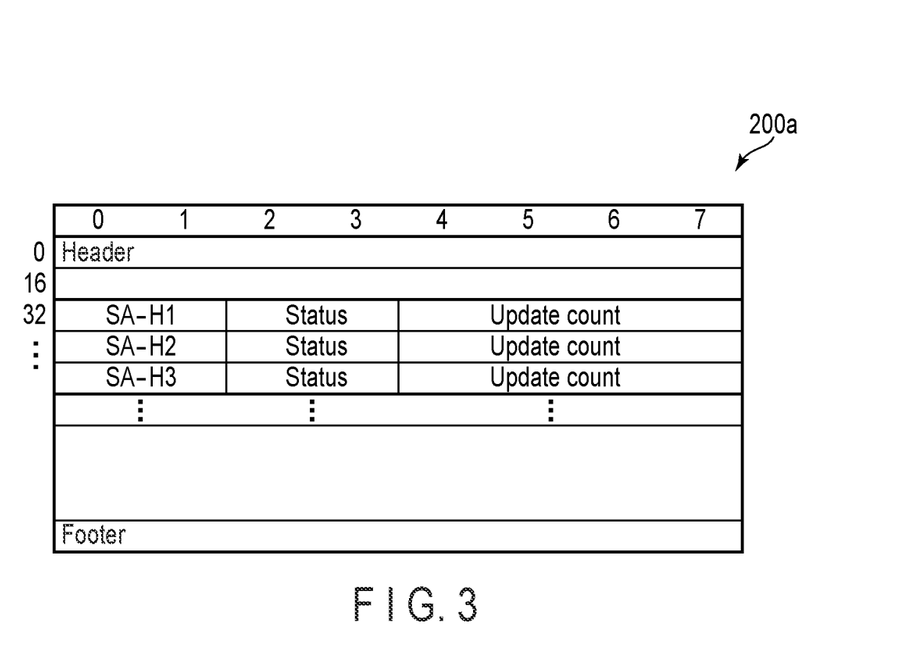
FIG. 3 is a view showing an example of the configuration of a system area management section according to the embodiment.

Next, the system area management section 200a will be described below. FIG. 3 is a view showing an example of the configuration of the system area management section 200a.

As shown in FIG. 3, a status and update count are stored in the system area management section 200a in correlation with each other for each of the eight magnetic heads 10 (magnetic head numbers SA-H1 to SA-H8). The magnetic head numbers SA-H1 to SA-H8 are respectively correlated with the already-described control information items H1 to H8. In the status column, a status indicating on which set control information storage processing has been carried out is stored. In this embodiment, the control information is stored in one of the set S1 and set S2, and hence in the status column, a status indicative of being the storage destination or status indicative of not being the storage destination is stored. It should be noted that when it is not possible to determine whether or not a status is a status indicative of being a storage destination for some reason or other, a status indicative of being an indefinite state where the storage destination cannot be determined is stored. In the update count column, the number of update times switching of the group has been carried out at the time of carrying out switching of the group is stored. In this embodiment, in each of the sets S1 and S2 (groups A, B, C, and D), the same control information is stored, and hence in each of the sets S1 and S2, the update count is inherited (that is, the same update count value does not exist astride the groups A, B, C, and D).

Figure 4:
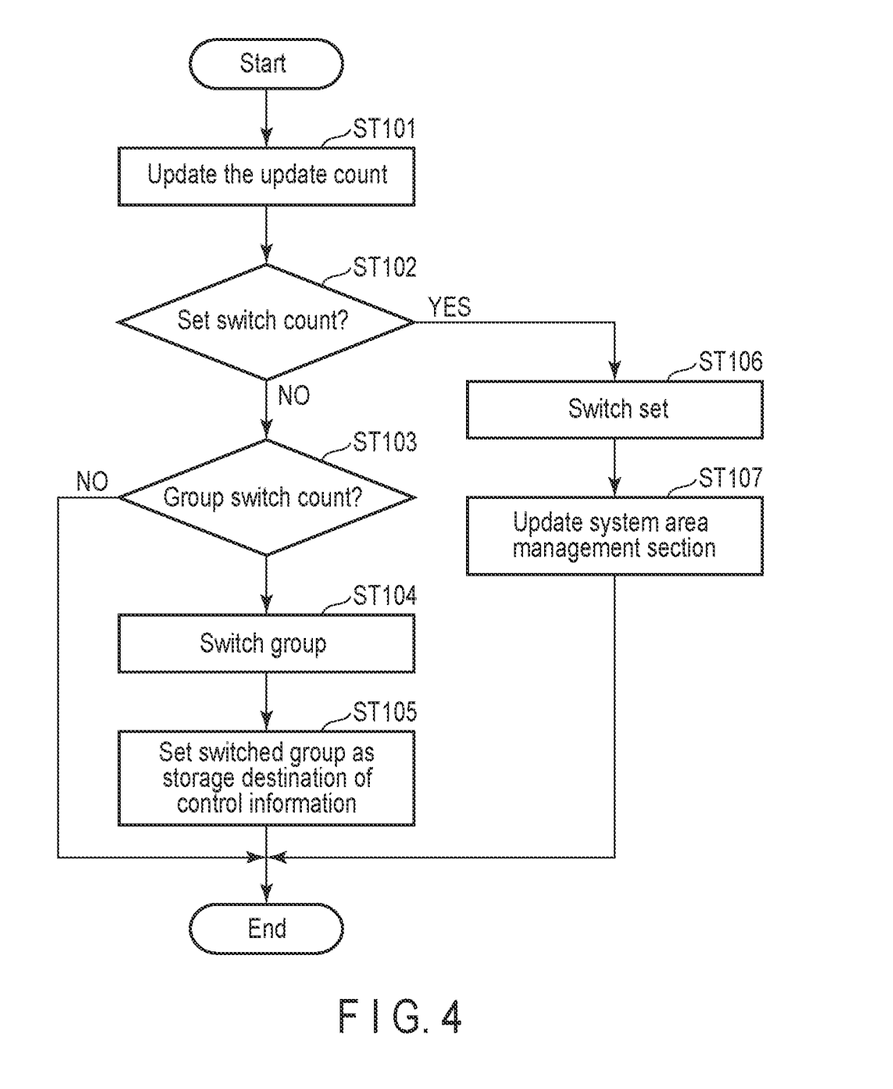
FIG. 4 is a flowchart showing an example of processing of switching a storage destination according to the embodiment.

Next, the processing or switching the storage destination of the control information will be described below. FIG. 4 is a flowchart showing an example of processing of switching the storage destination to be executed by the MPU 14. The following processing is processing to be executed after the MPU 14 stores the control information in the currently-set storage destination.

The MPU 14 updates the update count (ST101). More specifically, the MPU 14 updates the update count of the magnetic head number set as the storage destination of the system area management section 200a. For example, when the group A is set as the storage destination, the update counts of the magnetic head numbers SA-H1 and SA-H2 are incremented.

Next, it is determined whether or not the update count is the set switch count (ST102). More specifically, the MPU 14 determines whether or not the update count updated in step ST101 has reached the count of the set switch count 161.

Upon determination that the update count is not the set switch count (ST102: NO), the MPU 14 determines whether or not the update count is the group switch count (ST103). More specifically, the MPU 14 determines whether or not the update count updated in step ST101 has reached the count of the group switch count 162. In this embodiment, the group switch count is set at once (one time), and hence the MPU 14 determines that the update count is the group switch count. It should be noted that when the group switch count is set at a plurality of number of times, for example, it is sufficient if the MPU 14 determines whether or not the update count has reached the count of the group switch count 162 on the basis of a difference between the update count updated in step ST101 and update count of the switch destination group.

Upon determination that the update count is the group switch count (ST103: YES), the MPU 14 switches the group (ST104). Here, switching of the group is carried out within the set. For example, when after the control information is stored in the group A, switching of the group is determined, the MPU 14 switches the storage destination of the control information from the group A to the group B.

Then, the MPU 14 sets the switched group as the storage destination of the control information (ST105). In the already-described case, the group B becomes the storage destination of the control information. Thereby, when the control information is stored next time, the control information is stored in the switched group. Further, upon determination that the update count is not the group switch count (ST103: NO), the MPU 14 terminates this processing.

On the other hand, upon determination that the update count is the set switch count (ST102: YES), the MPU 14 switches the set of the storage destination of the control information (ST106). For example, when the set S1 is already set as the storage destination, if the update count is determined to be the set switch count, the storage destination of the control information is switched to the set S2. Then, the MPU 14 updates the system area management section 200a (ST107). For example, when the set S2 is switched to and set as the storage destination of the control information, the MPU 14 sets the statuses of the magnetic head numbers SA-H5 to SA-H8 as information indicative of being the storage destination of the control information, further sets the statuses of the magnetic head numbers SA-H1 to SA-H4 as information indicative of not being the storage destination of the control information, and then terminates this processing.

Figure 5:
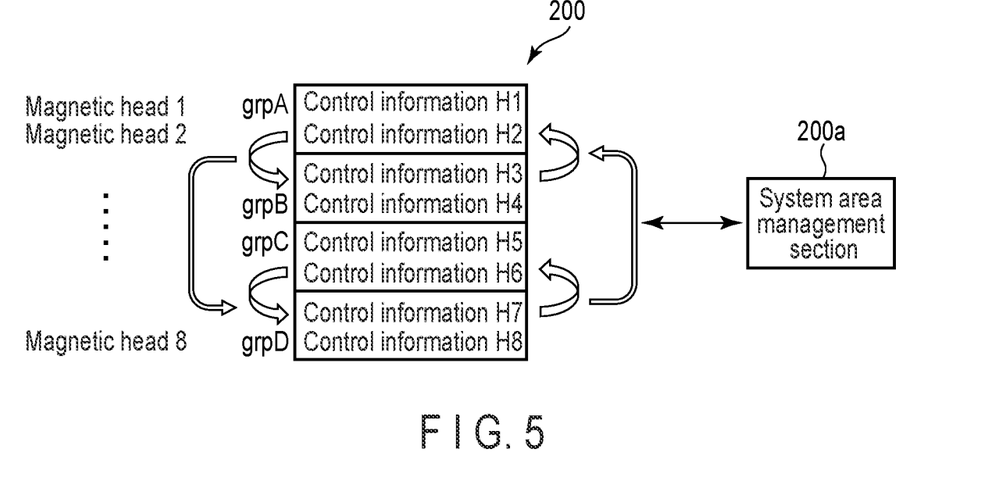
FIG. 5 is a view for explaining an operation of a case where the storage destination of control information is changed according to the embodiment.

Next, the operation to be carried out when the storage destination of the control information is changed will be described below. FIG. 5 is a view for explaining the operation.

In FIG. 5, when the storage processing of the control information to be carried out on the group A of the set S1 is finished, then the storage processing of the control information is carried out on the group B of the set S1. Further next, the storage processing of the control information is carried out on the group A. When the above operation is repeated up to the set switch count (in this embodiment, ten thousand times), then the set is switched. At this time, information indicating the switched set which becomes the storage destination of the control information is stored in the status of the system area management section 200a. In the already-described case, information indicating that the statuses of the groups C and D are the storage destination of the control information is stored, and information indicating that the statuses of the groups A and B are not the storage destination of the control information is stored.

As described above, switching of the set of the storage destination of the control information is executed in this embodiment at a frequency of once in ten thousand times which is the set switch count. Accordingly, the magnetic disk device 1 can make the number of times the control information is stored in the system area management section 200a smaller. Accordingly, the magnetic disk device 1 can make a further overhead of the storage processing time hardly occur by storing the information in the system area management section 200a.

Besides, switching of the storage destination of the control information between the groups A and B (or groups C and D) is alternately carried out. For this reason, when it becomes impossible to read the latest data, data immediately precedent to the data concerned in terms of time history is made readable in advance. For example, it is conceivable that the MPU 14 stores information concerning the immediately preceding data in the memory 16. Thereby, it becomes possible for the magnetic disk device 1 to lessen the difficulty in recovery at the time of failure occurrence.

Furthermore, at the time of turning-on of the power (not shown) to the magnetic disk device 1, the MPU 14 first reads the information of the system area management section 200*a*. Thereby, it is possible to determine whether the set to be read is the set S1 (groups A and B) or the set S2 (groups C and D) with respect to each control information item. Accordingly, the number of times the control information necessary for read of data is read from the system area 200 can be limited to four. Owing to this limitation, the magnetic disk device 1 can restrict the processing time necessary for read of the control information at the time of turning-on of the power.

Figure 6:
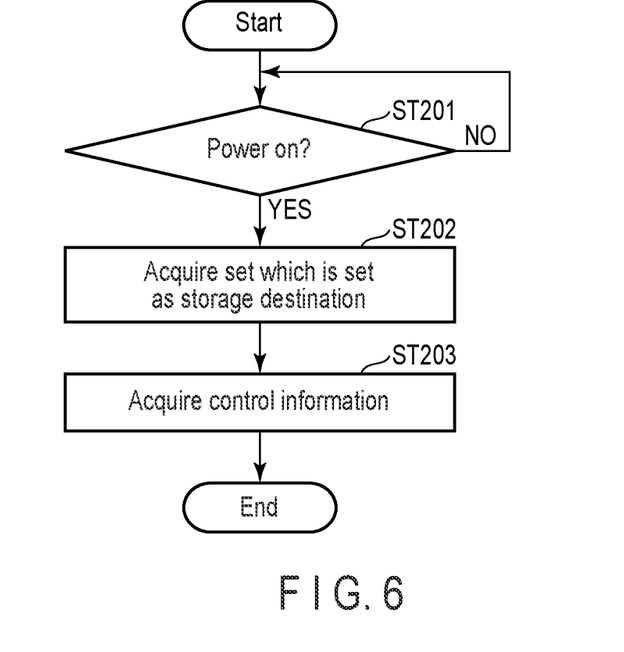
FIG. 6 is a flowchart showing an example of processing of reading control information to be carried out when the power is turned on according to the embodiment.

FIG. 6 is a flowchart showing an example of processing of reading control information to be carried out when the power is turned on. As shown in FIG. 6, upon determination that the power to the magnetic disk device 1 is turned on (ST201: YES), the MPU 14 refers to the system area management section 200*a* to thereby acquire a set which is set as the storage destination (ST202). By confirming the statuses of the magnetic head numbers SA-H1 to SA-H8 of the system area management section 200*a*, the MPU 14 acquires information concerning the set which is set as the storage destination. Next, the MPU 14 acquires the control information from the set which is set as the storage destination (ST203). Thereby, the four control information items of the set which is set as the storage destination are acquired.

Figure 7:
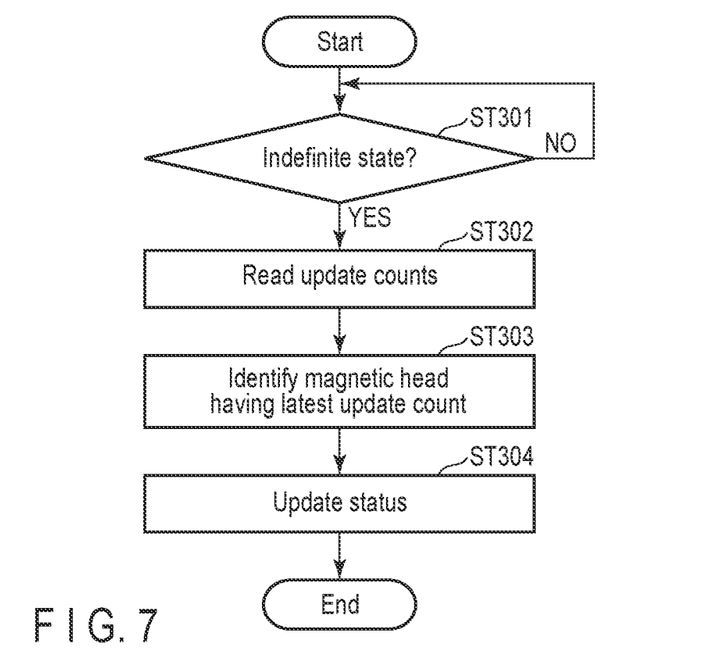
FIG. 7 is a flowchart showing an example of processing of a case where the status indicates an indefinite state according to the embodiment.

Further, for some reason or other, a case where the status of the system area management section 200*a* enters the already-described indefinite state can possibly occur. FIG. 7 is a flowchart showing an example of processing of a case where the status indicates an indefinite state when the MPU 14 reads the status of the system area management section 200*a*.

As shown in FIG. 7, when the status information indicates an indefinite state (ST301: YES), the MPU 14 reads the update counts of all the magnetic head numbers SA-H1 to SA-H8 of the system area management section 200*a* (ST302), identifies the magnetic head 10 having the latest update count information on the basis of the update counts (ST303), and updates the status (ST304). Thereby, the indefinite state of the status is dissolved, and the status is set in such a manner that the set including the magnetic head number the update count of which is the latest becomes the storage destination of the control information.

Figure 8:
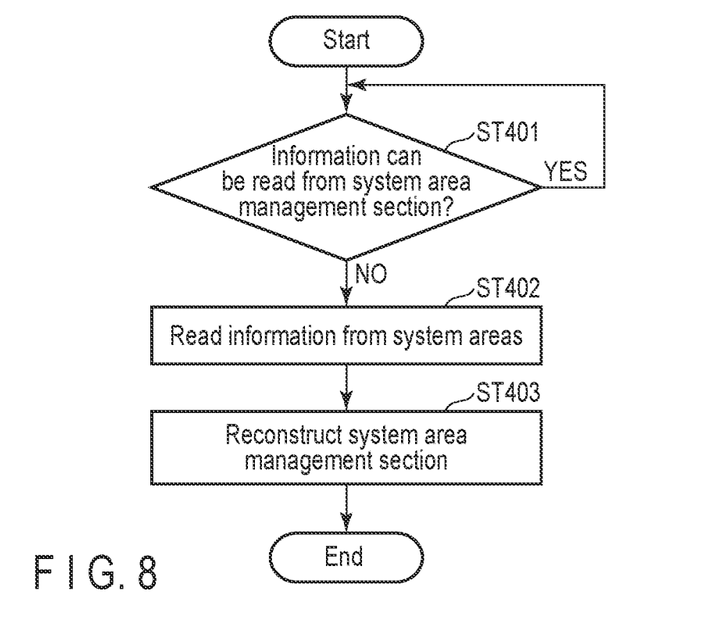
FIG. 8 is a flowchart showing an example of processing of a case where it becomes impossible to read information from the system area management section according to the embodiment.

Furthermore, for some reason or other, a case where it becomes impossible to read information from the system area management section 200*a* can also possibly occur. FIG. 8 is a flowchart showing an example of processing of a case where it becomes impossible to read information from the system area management section 200*a*.

As shown in FIG. 8, when it is not possible to read information from the system area management section 200*a* (ST401. YES), the MPU 14 reads the control information items from the system areas 200 of all the magnetic head numbers SA-H1 to SA-H8 (i.e., groups A to D) (ST402), and reconstructs the system area management section 200*a* on the basis of the read control information items (ST403). Thereby, even when information cannot be read from the system area management section 200*a*, it becomes possible for the magnetic disk device 1 to reconfigure the system area management section 200*a*.

As described above, according to the magnetic disk device 1, each time the processing of storing the control information in the system area 200 is repeated, the magnetic head 10 to be used to store the control information is switched. Accordingly, it is possible to eliminate the unevenness in the frequency of use of the magnetic head 10 including the STO 100. As described above, it is possible for the magnetic disk device 1 to avoid the unevenness in the frequency of use of the magnetic head 10 in the write operations, and prolong the life of the magnetic head 10.

Further, in the magnetic disk device 1, the storage processing of the status of the system area management section 200*a* at the time when the set S1 or S2 is switched is carried out about once in the set switch count, i.e., about one time in ten thousand times. Accordingly, it is possible for the magnetic disk device 1 to reduce the frequency of the storage processing, and prevent the overhead at the time of storage from becoming larger.

Furthermore, the magnetic disk device 1 carries out processing of storing historical data immediately precedent to the stored latest data. Thereby, it is possible for the magnetic disk device 1 to reduce the difficulty in recovery at the time of failure occurrence.

In addition, at the time of turning-on of the power, it is sufficient if only the magnetic disk device 1 reads the control information of one of the sets S1 and S2. Accordingly, the magnetic disk device 1 can restrict the processing time necessary for read of the system information at the time of turning-on of the power.

Further, although in the embodiment described above, the descriptions have been given by taking the case where the assist section which is provided in the magnetic disk device 1, and is configured to assist write of data is provided with the STO 100, i.e., is of the microwave assist system as an example, the assist section is not limited to this. For example, the assist section may be of the thermal assist system. Even when the magnetic disk device 1 includes an assist section of the thermal system, it is possible for the magnetic disk device 1 to exhibit an advantageous effect identical to the embodiment described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a plurality of magnetic disks;
a plurality of magnetic heads provided correspondingly to the plurality of magnetic disks and configured to carry out read/write of data from/to the magnetic disks; and
a control section configured to control read/write of the magnetic heads, wherein
each of the plurality of magnetic disks includes a first storage section storing therein control information concerning read/write of the magnetic head,
the control section switches the first storage section which is a storage destination of first information that is at least a part of the control information from the magnetic disk to another magnetic disk, controls to allow the switched original first storage section to store the first information therein again, the plurality of magnetic disks are divided into a plurality of sets, the control section switches the storage destination within the set each time the control section stores the control information, and when a storage count of the control information reaches a specified value, the control section switches the storage destination from one set to the other set.

2. The magnetic disk device of claim 1, further comprising a second storage section configured to, when the control section switches a set of the storage destination, store therein status information indicating the switched set as the storage destination.

3. The magnetic disk device of claim 1, wherein each of the plurality of magnetic disks constituting the sets is further divided into a plurality of groups within one set, and the control section switches the storage destination of the control information in such a manner that update count data items indicating update states of the control information of the plurality of groups of the sets are different from each other.

4. The magnetic disk device of claim 2, wherein the second storage section stores therein update count information indicating the update counts of the groups in addition to the status information indicating the switched set as the storage destination.

5. The magnetic disk device of claim 4, wherein when information indicating groups corresponding to the latest update count information cannot be obtained from the second storage section, the control section acquires the update count information of the groups from the first storage section, and recovers the information stored in the second storage section on the basis of the acquired update count information of the groups.

6. The magnetic disk device of claim 4, wherein when information cannot be read from the second storage section, the control section acquires the control information from the first storage section, and thereby reconfigures the information stored in the second storage section.

7. The magnetic disk device of claim 2, wherein when the power of the magnetic disk device is turned on, the control section first acquires information stored in the second storage section.

8. The magnetic disk device of claim 1, wherein the first information includes information concerning write of the magnetic head.

* * * * *